(12) United States Patent
Bethel (10) Patent No.: US 7,789,349 B2
(45) Date of Patent: Sep. 7, 2010

(54) AIRCRAFT VERTICAL SPEED INSTRUMENT DEVICE WITH MULTI-FUNCTIONAL DESIGN ASPECTS

(75) Inventor: Jeffery David Bethel, Albuquerque, NM (US)

(73) Assignee: Aspen Avionics, Inc., Albuquerque, NM (US)

( * ) Notice: Subject to any disclaimer, the term of this patent is extended or adjusted under 35 U.S.C. 154(b) by 124 days.

(21) Appl. No.: 11/430,071

(22) Filed: May 8, 2006

(65) Prior Publication Data

US 2006/0293804 A1 Dec. 28, 2006

Related U.S. Application Data

(60) Provisional application No. 60/680,415, filed on May 12, 2005.

(51) Int. Cl.
*G12B 9/00* (2006.01)
(52) U.S. Cl. ................................ 248/27.1; 340/971
(58) Field of Classification Search ................ 248/27.1; 340/971
See application file for complete search history.

(56) References Cited

U.S. PATENT DOCUMENTS

| | | | | |
|---|---|---|---|---|
| 2,100,604 A | * | 11/1937 | Kollsman | 248/27.1 |
| 4,913,383 A | * | 4/1990 | Hill et al. | 248/27.1 |
| 5,786,995 A | * | 7/1998 | Coleman | 700/83 |
| 5,844,504 A | * | 12/1998 | Etherington | 340/973 |
| 6,370,037 B1 | * | 4/2002 | Schoenfish | 361/807 |
| 6,606,559 B1 | * | 8/2003 | Beckmann et al. | 701/213 |
| 2005/0222766 A1 | * | 10/2005 | Burch et al. | 701/213 |
| 2006/0278521 A1 | * | 12/2006 | Stowell | 204/192.1 |
| 2007/0077540 A1 | * | 4/2007 | Testrake et al. | 434/37 |
| 2008/0094255 A1 | * | 4/2008 | Bethel | 340/971 |

* cited by examiner

*Primary Examiner*—Amy J Sterling
(74) *Attorney, Agent, or Firm*—Kutak Rock LLP; Bryan P. Stanley (57) ABSTRACT

The present invention provides a unique and novel device for indicating flight information to a pilot or co-pilot of an aircraft. The present invention is adapted to fit into an existing aircraft instrument panel at the location of, for example, a VSI instrument, and provides a digital display capable of providing a vast array of information to a pilot or co-pilot without the need to mechanically retrofit the instrument panel or replace safety-critical critical instruments.

20 Claims, 6 Drawing Sheets

AIRCRAFT VERTICAL SPEED INSTRUMENT DEVICE WITH MULTI-FUNCTIONAL DESIGN ASPECTS

CROSS-REFERENCE TO RELATED APPLICATIONS

This application claims the benefit of U.S. Provisional Application No. 60/680,415, filed May 12, 2005.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

The present invention relates generally to an aircraft vertical speed indicator (VSI), and more specifically to computerized VSI adapted to be inserted into an existing VSI instrument panel opening and providing added functionality to a pilot without the need to replace critical instruments or perform instrument panel modification.

The form factor of a standard VSI is referred to in the industry as a standard 3-inch round instrument, the instrument having a 3-inch round bezel that protrudes through the instrument panel into which the VSI is inserted, three mounting screws, a round glass faceplate protecting the needle assembly, and a "dog-leg" protrusion located on the lower left of the instrument face. This dog-leg area is used to locate a calibration adjustment (typically in the form of a slotted screw head) that is used to bias out needle errors and is used specifically with the VSI instrument and the altimeter. The remainder of the VSI instrument is typically located behind the instrument panel, and is of varying sizes and shapes.

A VSI is typically located in the "standard six" instrument cluster. This cluster is a grouping of six instruments, organized as three instruments across and two instruments high. The "standard six" instrument cluster is typically positioned in front of the pilot or co-pilot of an aircraft. A VSI traditionally resides in the lower right position within this standard instrument cluster, which puts it virtually directly in front of the pilot and biased slightly downward and to the right. The instrument panel space directly in front of the pilot, and including this instrument cluster, is referred to as being within the "primary instrument scan" of the pilot. This space is of especially high value while operating the aircraft as it requires little or no head movement to monitor the information presented.

A VSI instrument is unique in that it is one of the lowest criticality instruments residing within the standard six instrument cluster. More importantly, for traditional small-piston aircraft that make up the most populous segment of the domestic aircraft fleet, it is not a required instrument by regulation. Criticality refers to the safety implications if the instrument fails or provides incorrect information. If the VSI fails in any manner, the pilot reverts to the obvious and independent source of altitude information that is displayed on the adjacent altimeter. As such, the rate information provided by the VSI is used simply as a convenient method to control and monitor rates, while the altitude is the important piece of information that affects aircraft safety.

The low criticality, wide spread use, and non-required nature of the VSI instrument makes it a unique candidate for improvement. The present invention takes advantage of these unique characteristics and provides augmented functionality in a novel manner within the VSI form factor.

BRIEF SUMMARY OF THE INVENTION

The present invention provides an instrument for use in an aircraft instrument panel. The instrument includes an electronic display potion for providing information to an aircraft pilot. The instrument is sized and shaped such that it may be inserted into an opening traditionally containing a traditional vertical speed indication.

The information provided by the instrument to a pilot may be of any suitable type, though in one embodiment of the present invention the information provided is selected from the group consisting of vertical speed, altitude, maps, navigation data, terrain data, traffic data, lighting data, engine data, performance data, fuel data, and combinations thereof.

In one embodiment, the present instrument further includes a flange portion that defines a perimeter of the display portion, the flange portion including an opening adapted to receive a fastener such that the instrument may be removably attached to an aircraft instrument panel.

In another embodiment of the present invention, the instrument includes a photo cell that is capable of sensing the ambient lighting, the photo cell being in electronic communication with the display portion such that the brightness of the display can be modified as needed according to the ambient lighting.

In another embodiment of the present invention, the instrument includes a housing portion extending from the flange portion and defining a perimeter of the display portion. In still another embodiment of the present invention, the instrument further includes a dog-leg portion extending away from the housing along a plane substantially parallel to the plane of the flange portion.

In another embodiment of the present invention, the electronic display portion is preferably an LCD.

The present invention also provides an aircraft instrument panel having included therein an instrument as described above and throughout the present disclosure. The aircraft instrument panel may include a standard six cluster of instruments, and in some embodiments having such a cluster, the present invention occupies the lower right portion of the cluster.

DETAILED DESCRIPTION OF THE INVENTION

The present invention utilizes an electronic display such as, for example, a liquid crystal display (LCD), the display being merged into the unique VSI form factor and digitally replicating the VSI functionality on the display, thereby allowing a vast array of additional information to be presented on the display screen. The VSI functionality is preferably implemented via a vertically-oriented tape-type indicator on the display, thereby requiring minimal display space.

The display, whether LCD or otherwise, is driven by a set of electronics residing either within the instrument itself or located elsewhere on an aircraft. The unique mechanical aspects of a traditional VSI are preferably retained, including the dog-leg portion of the traditional VSI. This portion of the instrument may, however, be used to locate a control knob providing user interface functionality to the unit, as the adjustment screw provided with a traditional mechanical VSI is not required. The present device may include internal rate sensing, such as that derived from an integrated pressure transducer, or may obtain and/or compute rate information from external equipment, such as from an air-data computer. Any other suitable method of obtaining or providing rate data may also be used, and it is contemplated that the present device may use a combination of internal and external rate sensing or measurement. The present instrument is sized, shaped, and configured such that it allows direct replacement of a traditional VSI instrument with no aircraft instrument panel modifications.

The remaining, unused portion of the display of the present device may be used for displaying virtually any flight information or annunciation deemed valuable to a pilot. Such displays may include, among other data, moving maps, navigation, terrain, traffic, lightning, engine and general aircraft status or performance, or combinations of these and others. Indicator lamps such as altitude, terrain warning, cabin pressure, and gear alerting may also be integrated with the present device.

Turning now to the drawings, wherein like numerals indicate like parts, the numeral 10 indicates generally an instantaneous vertical air speed instrument (IVSI) device constructed in accordance with the teachings of the present invention. Instrument 10 includes generally a display screen 12 (such as, for example, an LCD), a flange 14, openings 16, annunciator lamps 18, and protective covering 20.

Figure 1:
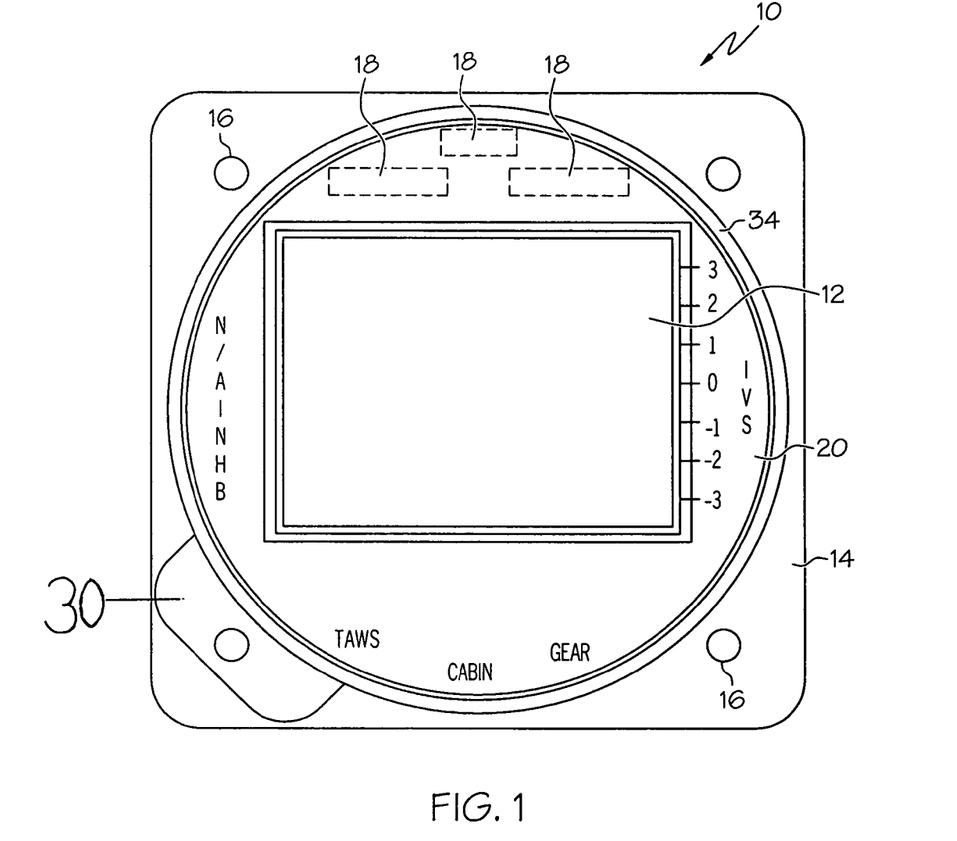
FIG. 1 provides a schematic view of one embodiment of a VSI device constructed in accordance with the teachings of the present invention.

As shown in FIG. 1, display screen 12 is oriented in a horizontal or "landscape" orientation, with VSI graduation marks located to the right of display screen 12. It is contemplated that any suitable markings may be provided with the present device, or that marking may instead be omitted all together, being provided on display screen 12 itself rather than separately therefrom.

Flange 14 is preferably provided extending along a periphery of instrument 10, providing support thereto as well as a mechanism by which instrument 10 may be secured in place in an aircraft instrument panel. Openings 16 are provided such that screws or other fasteners may be used to secure instrument 10 to an aircraft instrument panel. It is contemplate that flange 14 may be constructed of any suitable material, including metals or suitable polymers.

Annunciator lamps 18, as shown in FIG. 1, provide additional functionality to instrument 10. As shown in the figure, three lamps 18 are present, one providing an indicator for altitude and two providing indicators for terrain. While annunciator lamps 18 are preferably provided with instrument 10, it is contemplated that they may be omitted entirely, or that annunciator lamps may provide information other than that shown in the figure. Although three annunciator lamps 18 are shown, any suitable number of annunciator lamps (whether a single lamp, more than one lamp, or no lamps at all) may be utilized.

Protective covering 20 is secured over display 12 in order to protect it from damage. Protective covering 20 may be constructed from glass, as traditionally used in aircraft instrumentation, or may be constructed from any other suitable materials, including any of various polymers, provided that the material allows a pilot to view display 12 through protective covering 20.

Also shown in FIG. 1 is a housing portion 34 extending around a perimeter of the instrument, housing portion 34 preferably being substantially circular in shape. Housing portion 34 preferably extends cylindrically along a longitudinal axis perpendicular to the plane of the paper on which FIG. 1 is shown, housing the electronic components of the present device therein. It is contemplated, however, that any suitable shape of housing portion 34 may be used. Housing portion 34 may be constructed from plastic, other polymers, metal, or any suitable material or combination of materials.

FIG. 1 also shows a dog-leg portion 30 located at the lower right portion of instrument 10. Dog-leg portion 30 may be omitted entirely, though it is preferably present and may be utilized as described with respect to FIG. 2, below. As shown in FIG. 1, dog-leg portion 30 preferably extends away from housing portion 34 and is formed integrally therewith.

Figure 2:
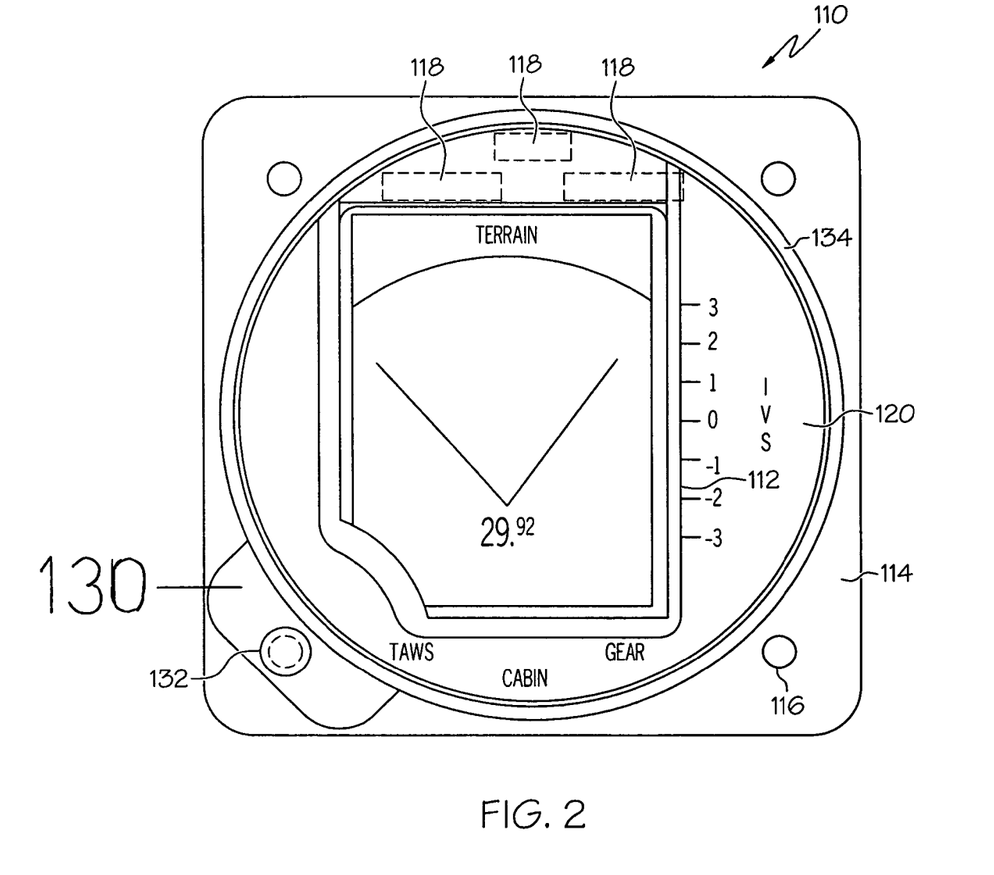
FIG. 2 provides a schematic view of an alternative embodiment of a VSI device constructed in accordance with the teachings of the present invention.

FIG. 2 provides a schematic view of an alternative embodiment of an instrument constructed in accordance with the teachings of the present invention the instrument being designated generally by the number 110. Instrument 110 includes generally a display portion 112, a flange 114, openings 116, annunciator lamps 118, protective covering 120, and housing portion 134. These components of instrument 110 are substantially the same as the corresponding components described with respect to instrument 10, above, As shown in FIG. 2, display 112 is oriented in a vertical or "portrait" orientation. Dog-leg portion 130 of instrument 110 includes a control knob 132 to control the information displayed on display portion 112. control knob 132 may a-so be used to make adjustments to the information displayed on display portion 112. Although dog-leg portion 130 is depicted as having a control knob 132 associated therewith, it is contemplated that buttons, switches, or any other method of controlling or adjusting the information displayed on display portion 112 may be provided.

Figure 3:
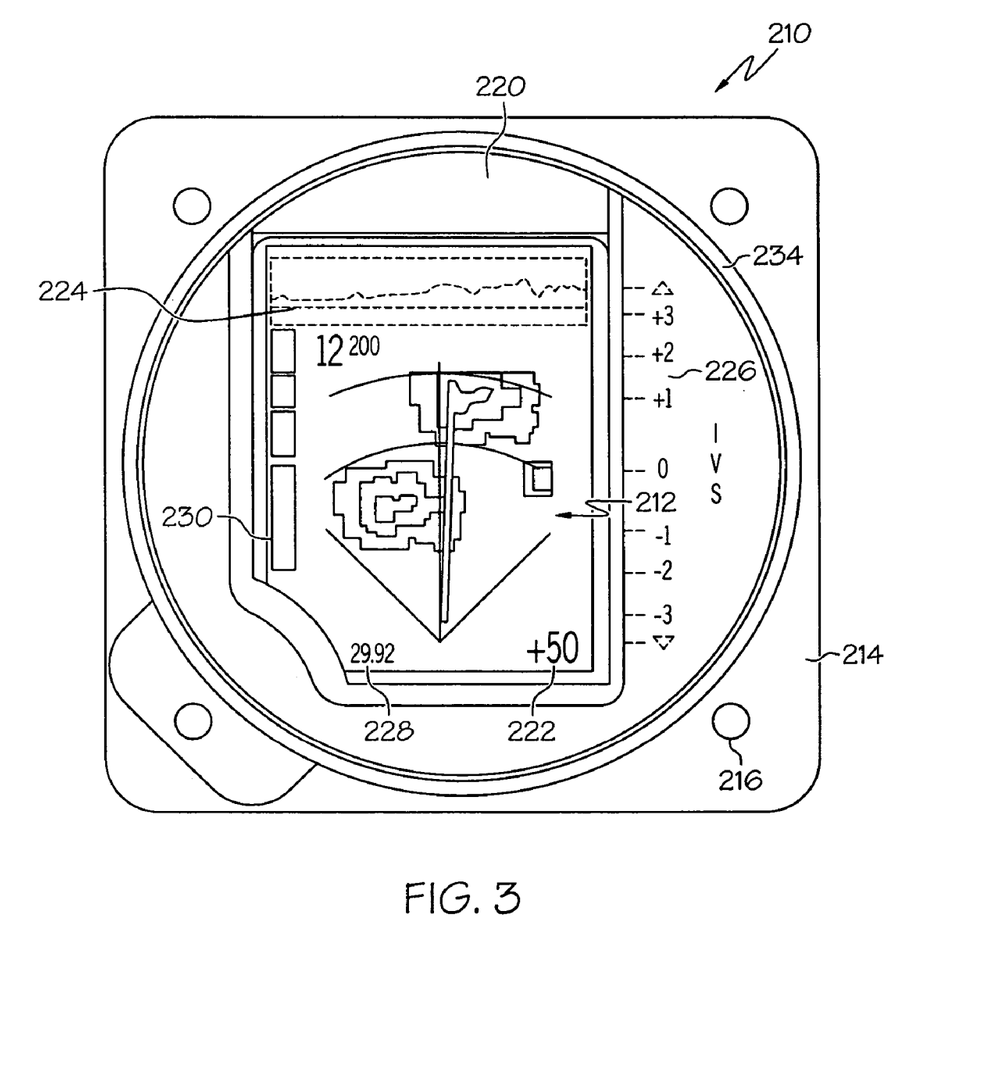
FIG. 3 provides a schematic view of an alternative embodiment of a VSI device constructed in accordance with the teachings of the present invention.

FIG. 3 provides a schematic view of another alternative embodiment of an instrument constructed in accordance with the teachings of the present invention, the instrument being indicated generally by the numeral 210. Instrument 210 includes generally a display portion 212, a flange 214, openings 216, protective covering 220, and housing portion 234. These components of instrument 210 are substantially the same as the corresponding components described with respect to instrument 10, above. As shown in FIG. 3, display 212 is oriented in a vertical or "portrait" orientation. Although instrument 210 is not shown as including annunciator lamps as provided in the embodiment above, it is contemplated that such annunciator lamps may be provided with the embodiment of the present instrument shown in FIG. 3. Various areas of the schematic illustration of FIG. 3 provide additional functionality that may be provided with various embodiments of the present invention. For example, area 222 provides a top-down view of a relative terrain profile, area 224 provides a side-view terrain profile, area 226 provides a digital vertical speed indication, area 228 provides a barometric setting, and area 230 provides a rising terrain bar that gives a pilot a graphical rendering of height above ground. These features are all included in the present instrument such that they are provided to a pilot without the need to substantially alter the aircraft instrument panel or eliminate critical instruments.

Figure 4:
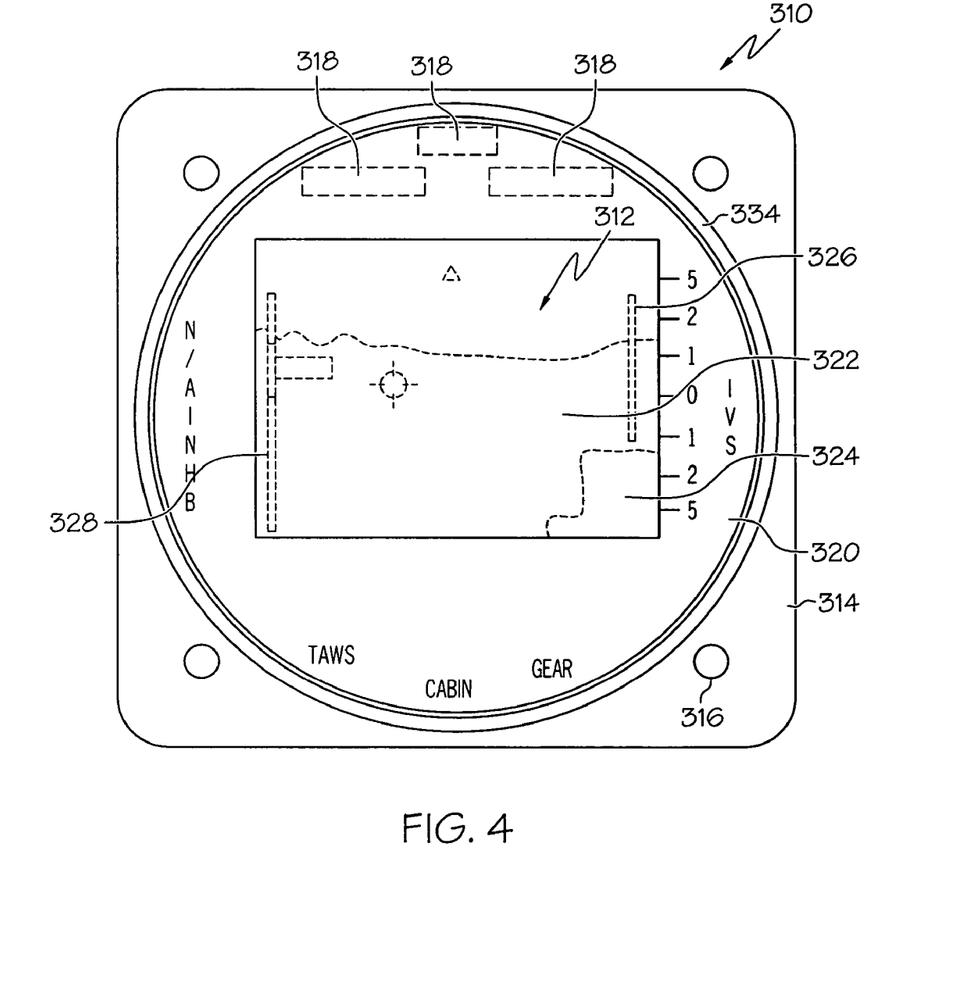
FIG. 4 provides a schematic view of an alternative embodiment of a VSI device constructed in accordance with the teachings of the present invention.

FIG. 4 provides a schematic view of another alternative embodiment of an instrument constructed in accordance with the teachings of the present invention, the instrument being indicated generally by the numeral 310. Instrument 310 includes generally a display portion 312, a flange 314, openings 316, annunciator lamps 318, and protective covering 320. These components of instrument 310 are substantially the same as the corresponding components described with respect to instrument 10, above. Although no dog-leg portion is shown in FIG. 4, it is contemplated that the embodiment of the present invention shown in the figure may include such a dog-leg portion. As shown in FIG. 4, display 312 is oriented in a horizontal or "landscape" orientation. Area 322 of instrument 310 provides a forward looking, synthetic vision of rising terrain profiles. Area 324 may provide additional information such as, for example, a compass or other directional indicator. Likewise, any suitable information or data may be provided in areas 326 or 328, and these areas may be sized, shaped, and located along display portion 312 as necessary or desirable.

Figure 5:
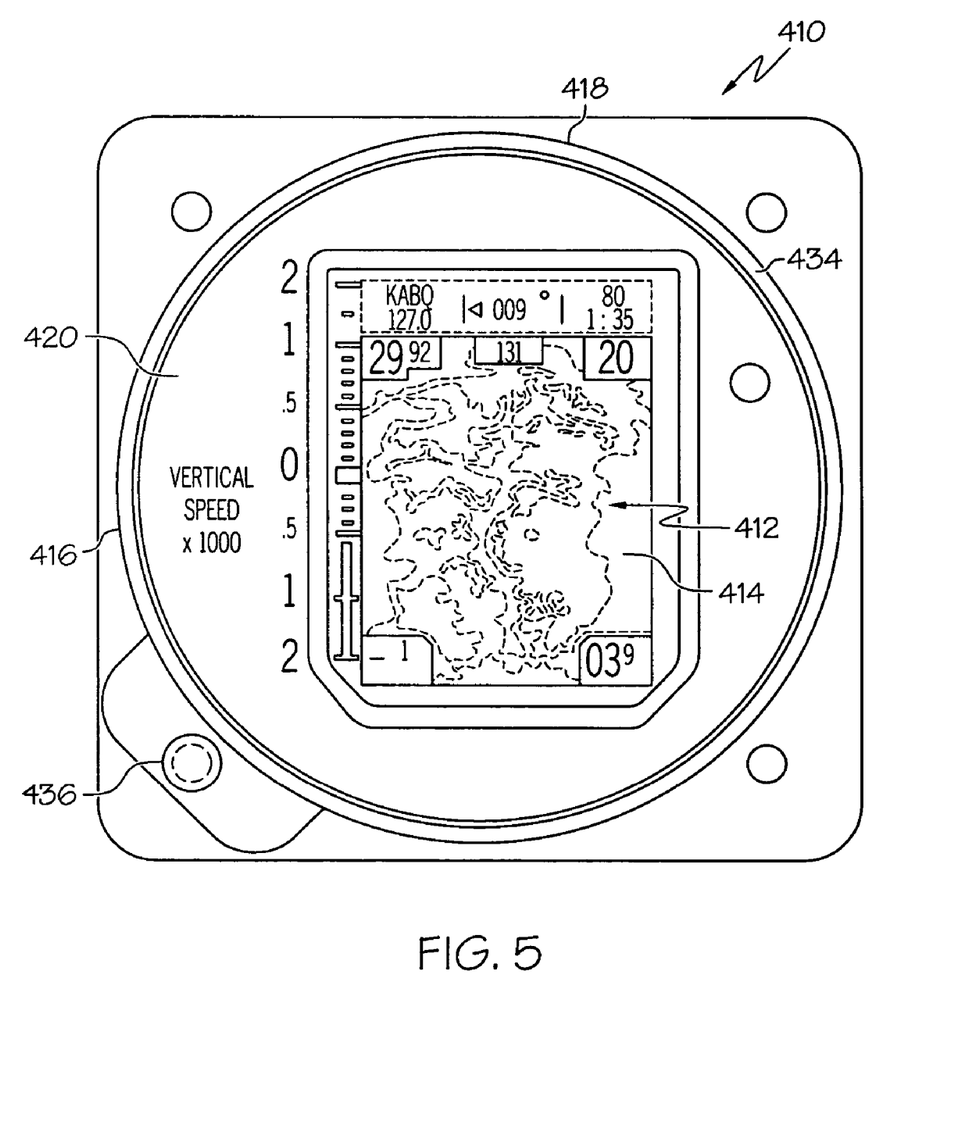
FIG. 5 provides a schematic view of an alternative embodiment of a VSI device constructed in accordance with the teachings of the present invention.

FIG. 5 provides a schematic view of another alternative embodiment of an instrument constructed in accordance with the teachings of the present invention, the instrument being indicated generally by the numeral 410. Instrument 410 includes generally a display portion 412, a flange 414, openings 416, protective covering 420, and housing portion 434. Display 412 of instrument 410 is provided in a horizontal or "landscape" position. Areas of display 412 are adapted to provide a variety of information to a pilot. For example, area 414 provides a vertical speed indicator scale, area 416 provides a rising terrain bar, and area 418 provides additional navigation data. Also provided is photo cell 436, allowing instrument 410 to automatically dim or brighten display 412 depending on the ambient light levels.

Figure 6:
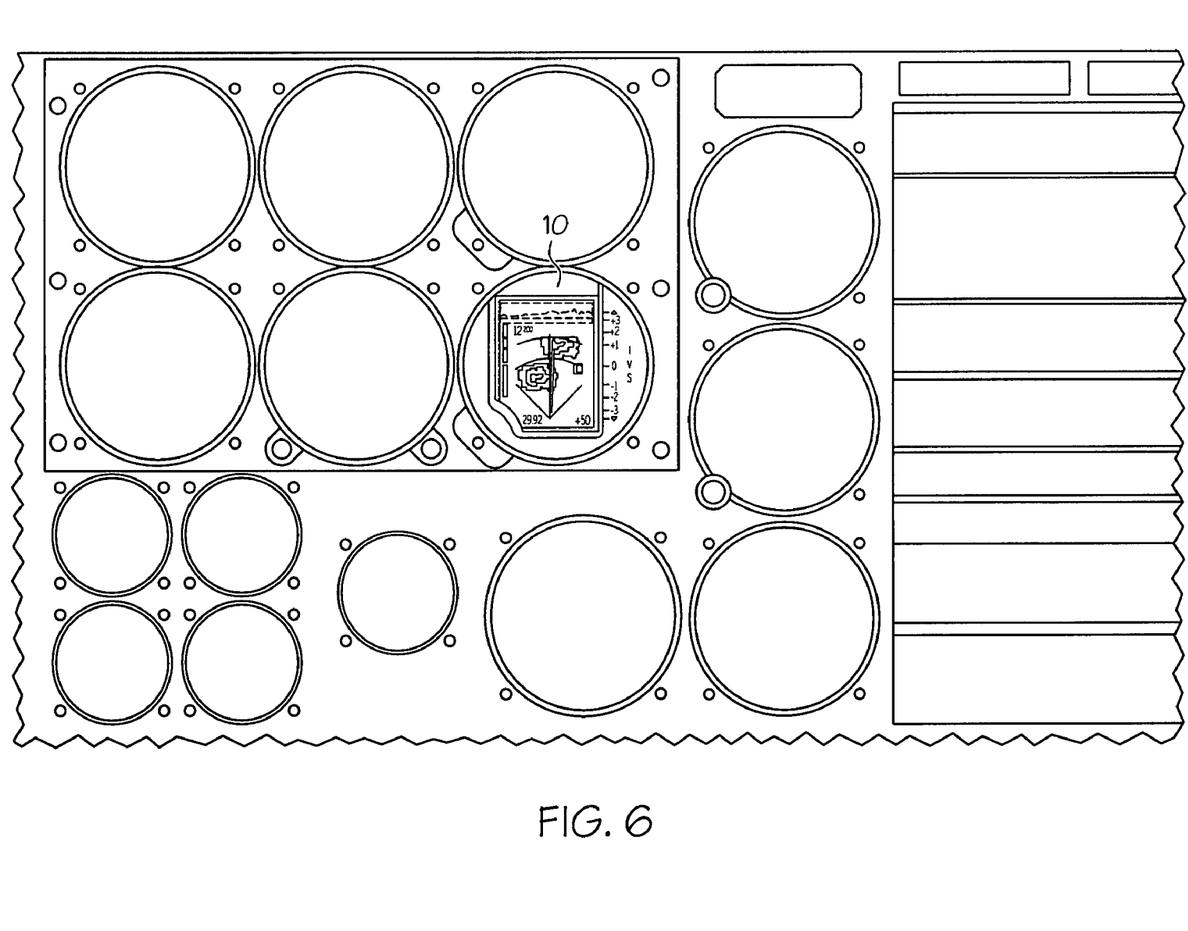
FIG. 6 provides a schematic view of a typical aircraft instrument panel, showing a VSI device constructed in accordance with the teachings of the present invention inserted therein.

FIG. 6 is a schematic view of an aircraft instrument panel showing an embodiment of instrument 10 positioned therein. As can be seen from the figure, critical instruments are not sacrificed in order to provide the added functionality provided by the present invention. This alleviates problems associated in the art stemming from the need to modify the instrument panel or replace or relocate existing equipment in order to provide additional functionality. When using the present instrument, the space constraints associated with aircraft instrument panels do not pose a problem.

The detailed description set forth above is provided to aid those skilled in the art in practicing the present invention. The invention described and claimed herein, however, is not to be limited in scope by the specific embodiments disclosed because these embodiments are intended to be illustrative of several aspects of the invention. Any equivalent embodiments are intended to be within the scope of the present invention. Various modifications of the invention which do not depart from the spirit or scope of the present invention, in addition to those shown and described herein, will become apparent to those skilled in the art from the foregoing description.

For example, an embodiment of the present device may be provided having an instantaneous vertical speed instrument, thereby providing an enhancement of vertical speed response time with respect to traditional pneumatic-type instruments. Likewise, it is contemplated that while the present instrument is preferably located in place of a traditional VSI instrument, the present instrument may be located in other positions on the aircraft instrument panel. Further, the VSI bar of the present instrument may be located on the left side of the instrument to mimic the point location of a traditional VSI, thereby providing information in the location at which a pilot is accustomed to looking for it.

It is also contemplated that any of the various features or information provided by the present invention may be moved to different locations on display 12 without departing from the spirit or scope of the present invention. For example, in FIG. 3 the rising terrain bar may be provided on top of the VSI bar.

The present instrument may also be provided with an integral pressure sensor used to determine both vertical speed and pressure altitude directly within the unit, thereby eliminating the need for an external air data computer connection.

Such modifications as those above are intended to fall within the scope of the appended claims. Various other modifications will be apparent to those in skill of the art upon reading this disclosure. The examples and embodiments described above are exemplary and are not intended to limit to scope of the present invention, which is limited only by the claims that follow.

The invention claimed is:

1. An instrument for use in an aircraft instrument panel, the instrument comprising:
    an electronic display portion to display information to a pilot of an aircraft, the instrument being sized and shaped to be inserted into an aircraft instrument panel in an opening traditionally containing a traditional vertical speed indicator;
    a flange portion (i) fixedly attached to said display portion (ii) surrounding a perimeter of said display portion (iii) extending from said perimeter of said display portion, and (iv) having four corners that define a flange portion perimeter;
    a housing portion extending from said flange portion and defining said perimeter of said display portion;
    a plurality of annunciator lamps on the instrument; and
    a dog-leg portion extending from said housing portion and directly toward only one corner of said flange portion four corners, the dog-leg portion extending along a plane substantially parallel to a plane defined by said flange portion such that the dog-leg portion abuts the flange.

2. The instrument according to claim 1 wherein the information displayed to said pilot is selected from the group consisting of vertical speed, altitude, maps, navigation data, terrain data, traffic data, lighting data, engine data, performance data, fuel data, and combinations thereof.

3. The instrument according to claim 1, wherein the flange portion has at least one opening formed on a flange outer perimeter located outside the perimeter of the display portion such that the one opening is not concealed by the display portion, the opening sized and shaped to receive a fastener such that said instrument may be attached to an aircraft instrument panel.

4. The instrument according to claim 1 further comprising:
    a photo cell to sense the ambient light and transmit ambient light data to said instrument such that brightness of said display portion is adjusted according to the ambient light data, the photo cell in electronic communication with said display portion.

5. The instrument according to claim 1 wherein said housing portion is formed integrally with said flange portion.

6. The instrument according to claim 1 wherein said dog-leg portion is formed integrally with said flange portion.

7. The instrument according to claim 1 further comprising:
a control portion fixedly attached to said dog-leg portion, said control portion adapted to allow a user to control user-controllable features of said electronic display portion.

8. The instrument according to claim 1 wherein said electronic display portion is an LCD.

9. An aircraft instrument panel, said panel having a plurality of instruments positioned therein, the instrument panel comprising:
an instrument having an electronic display portion to display information to a pilot of an aircraft, the instrument being removably attached to said instrument panel in an opening traditionally containing a traditional vertical speed indicator;
a flange portion (i) fixedly attached to said display portion, (ii) surrounding a perimeter of said display portion, (ii) extending from said perimeter of said display portion, and (iv) having four corners that define a flange portion perimeter;
a plurality of annunciator lamps on the instrument;
a dog-leg portion extending away from said housing portion and directly toward only one corner of said flange portion four corners, the dog-leg portion extending along a plane substantially parallel to a plane defined by said flange portion such that the dog-leg portion abuts the flange; and
a housing portion extending from said flange portion and defining a display portion perimeter,
wherein the flange has apertures formed in at least two of the four corners,
wherein the flange portion perimeter is larger than the display portion perimeter such that the display perimeter does not conceal the apertures.

10. The aircraft instrument panel according to claim 9 wherein the information being displayed to a pilot using said instrument is selected from the group consisting of vertical speed, altitude, maps, navigation data, terrain data, traffic data, lighting data, engine data, performance data, fuel data, and combinations thereof.

11. The aircraft instrument panel according to claim 9 wherein the instrument further comprises:
at least one fastener insertable through one of said apertures such that said instrument is removably attached to said instrument panel.

12. The aircraft instrument panel according to claim 9 further comprising:
a photo cell mounted through one of said apertures to sense ambient light and transmit ambient light data to said instrument such that a display portion brightness is adjusted according to the ambient light data.

13. The aircraft instrument panel according to claim 9,
wherein said aircraft instrument panel comprises a standard six instrument cluster, and
wherein said instrument is positioned within said standard six instrument cluster.

14. The aircraft instrument panel according to claim 13 wherein said instrument is positioned at a lower-right portion of said standard six instrument cluster.

15. The instrument according to claim 1, said instrument further comprising:
an aperture through the dog-leg portion to accommodate at least one controller mounted directly thereon.

16. The aircraft instrument panel according to claim 9, said instrument further comprising:
an aperture through the dog-leg portion to accommodate at least one controller mounted directly thereon.

17. The aircraft instrument panel according to claim 15, wherein the controller is a photocell to sense ambient light and transmit ambient light data such that a display portion brightness is adjusted according to the ambient light data.

18. The aircraft instrument panel according to claim 1, wherein the dog-leg portion (i) extends from only one side of the housing, (i) abuts the flange on a first side of the dog-leg portion, and (iii) abuts a controller on a second side of the dog-leg portion.

19. The aircraft instrument panel according to claim 1, wherein the annunciator lamps include an altitude indicator and two terrain indicators.

20. The aircraft instrument panel according to claim 9, wherein the annunciator lamps include an altitude indicator and two terrain indicators.

* * * * *